United States Patent [19]
Atallah et al.

[11] Patent Number: 5,802,574
[45] Date of Patent: Sep. 1, 1998

[54] METHOD AND APPARATUS FOR QUICKLY MODIFYING CACHE STATE

[75] Inventors: Deif Atallah, Chandler, Ariz.; Mitchell Kahn, San Jose, Calif.

[73] Assignee: Intel Corporation, Santa Clara, Calif.

[21] Appl. No.: 670,753

[22] Filed: Jun. 24, 1996

Related U.S. Application Data

[63] Continuation of Ser. No. 173,985, Dec. 28, 1993, abandoned.

[51] Int. Cl.[6] ............................. G06F 9/308; G06F 11/00
[52] U.S. Cl. ........................ 711/144; 711/3; 711/118; 711/123; 711/135; 711/145; 711/146
[58] Field of Search ...................... 395/471, 472, 395/403, 445, 447, 462, 182.03, 468, 421; 371/51.1; 711/118, 135, 123, 144, 145, 146, 3

[56] References Cited

U.S. PATENT DOCUMENTS

| | | | |
|---|---|---|---|
| 4,355,355 | 10/1982 | Butwell | 364/200 |
| 5,321,827 | 6/1994 | Lu et al. | 395/500 |
| 5,341,508 | 8/1994 | Keely et al. | 395/800 |
| 5,355,467 | 10/1994 | MacWilliams et al. | 395/425 |
| 5,375,216 | 12/1994 | Moyer et al. | 395/421 |
| 5,448,719 | 9/1995 | Schultz | 395/182.03 |
| 5,524,234 | 6/1996 | Martinez et al. | 395/468 |
| 5,629,950 | 5/1997 | Godiwala et al. | 371/51.1 |

OTHER PUBLICATIONS

Applicant's admitted art(Figure 2), Dec. 28, 1993.

*Primary Examiner*—Eddie P. Chan
*Assistant Examiner*—Than V. Nguyen
*Attorney, Agent, or Firm*—Blakely, Sokoloff, Taylor & Zafman

[57] ABSTRACT

The state of cached data may be modified without performing a tag comparison. Each cache line includes at least one attribute bit and at least one state bit. A processor issues an instruction requesting modification of the state of all cache lines associated with an attribute specified by the instruction. Qualifying logic modifies the state of a cache line as a function of the attributes stored in the cache line and the attribute specified by the instruction.

18 Claims, 8 Drawing Sheets

| ADDRESS RANGE | ATTRIBUTES |
|---|---|
|  |  |
|  |  |
|  |  |
|  |  |
|  |  |

LAU 404

FIG. 6

METHOD AND APPARATUS FOR QUICKLY MODIFYING CACHE STATE

This is a continuation of application Ser. No. 08/173,985, filed Dec. 28, 1993, now abandoned.

BACKGROUND OF THE INVENTION

1. Field of the Invention

The present invention relates to data processing systems utilizing cache memories, and more particularly to modifying the state of cache memory.

2. Art Background

Caches are used in various forms to reduce the effective time required by a processor to access instructions or data that are stored in main memory. The theory of a cache is that a system attains a higher speed by using a small portion of very fast memory as a cache along with a larger amount of slower main memory. The cache memory is usually placed operationally between the data processing unit or units and the main memory. When the processor needs to access main memory, it looks first to the cache memory to see if the information required is available in the cache. When data and/or instructions are first called from main memory, the information is stored in cache as part of a block of information (known as a cache line) that is taken from consecutive locations of main memory. During subsequent memory accesses to the same addresses, the processor interacts with the faster cache memory rather than main memory. Statistically, when information is accessed from a particular block in main memory, subsequent accesses most likely will call for information from within the same block. This locality of reference property results in a substantial decrease in average memory access time.

FIG. 1 is a simplified block diagram of a cache 100. The cache includes a set of cache lines such as cache line 102. Each cache line is capable of storing a block of data 104 from consecutive addresses in main memory. Each cache line is associated with a tag 106, which represents the block address of the line. A valid bit 108 indicates cache coherency, i.e., that the data in the cache accurately reflects the data maintained at the same address in main memory. The reading and writing of data in the cache is controlled by a cache access logic circuit 110.

The use of a cache in the context of a computer system is illustrated in FIG. 2. Over an internal central processing unit (CPU) bus 200, a CPU 202 interacts with the cache 100. A memory management unit (MMU) 204 controls the addressing of the cache, and a bus control unit (BCU) 206 controls the access of the cache 100 and the CPU 202 to a system bus 208. The system bus 208 enables the cache 100 and the CPU 202 to exchange information with a main memory 210. A bus mastering I/O device (such as an Ethernet controller) or a second processor 212, also may access data from the main memory 210 over the system bus 208.

In a typical computer system utilizing virtual memory, the MMU 204 translates virtual addresses issued by the CPU 202 into physical addresses for accessing main memory 210. The memory mapping from virtual to physical addresses may be stored in a page table 214 in the main memory 210. The MMU 204 includes a translation lookaside buffer, which is a cache storing a subset of the page table 214 to permit rapid access to the mapping represented by the subset. Other information that is stored in each page table entry is a presence bit, which indicates whether or not the referenced address is presently assigned to the main memory 210 (if not, secondary memory must be accessed) and a protection mask, which indicates the current program's access rights (read and write, read only, or no access, among others) to the addressed physical page. An access request to a page that is not present in main memory, or an access attempt without the proper access rights, results in a trap that aborts the current micro-instruction and transfers control to an appropriate operating system micro-program.

When the CPU 202 attempts to access the main memory 210, the address issued by the CPU 202 is presented to the MMU 204. If MMU 204 determines that CPU 202 has access rights, then MMU 204 presents the address to the cache access logic 110 in the cache 100. The cache access logic 110 compares the relevant part (the tag field) of the physical address containing the block address to addresses it currently stores in the tag array 106. If there is a match, i.e., a cache hit, then the data found at the referenced address is returned to the CPU 202. If, however, the address fails to match any of the tag addresses, i.e., a cache miss occurs, then the BCU 206 copies into the cache 100 the main memory data block containing the information at the addressed location. The BCU 206 also sets the corresponding valid bit, which indicates cache coherency.

Incoherency between the cache and main memory arises in many situations. For example, another CPU processor or I/O processor, such as an Ethernet controller, typically reads and writes data to specified regions of the main memory 210 that are denoted as "buffers". Incoherency occurs when the device 212 writes data into the main memory 210 at buffer locations which have been cached by the CPU 202 in cache 100. Such inconsistencies may be overcome through various means. One method of avoiding incoherency is to prohibit the cache from caching the buffer regions of main memory. However, using an uncacheable region eliminates the opportunity to use faster cache memory and thus reduces the speed of CPU operations on buffer data. Alternatively, the entire cache may be invalidated when any part of it is known to be incoherent. This technique is fast, but degrades performance because coherent data is also invalidated.

As another alternative, the cache 100 may monitor or "snoop" the address pins of main memory 210 to determine whether the device 212, or another device is writing to main memory. If so, the tag field of the address is compared to the tag in the cache 100. If there is a hit, the cache may change the valid bit associated with the cache line containing the address issued by the device 212 to indicate that the associated cache line is invalid. Because device 212 may typically operate on large blocks of data located at cached addresses, many cache lines will need to be invalidated. Every buffer address must be compared to every tag in the cache to determine whether a cache line includes a buffer address that would require invalidation. Because the buffer space is relatively large compared to the cache capacity, this comparison process can occupy the CPU 202 for thousands of clock cycles.

The need to perform tag comparisons not only slows the invalidation of cache areas, but also hampers cache performance in other contexts. The MESI (Modified-Exclusive-Shared-Invalidated) protocol is used to maintain coherency in a multiprocessor system among on-chip caches coupled to the same main memory. Under certain circumstances, one processor in the multiprocessor system may request a change in the MESI state of a large number of cache lines. For example, after a first processor has modified data in an area of cache marked "Exclusive" to that processor, the state of corresponding cache lines in the first processor's cache is switched to "Modified" (by the MMU). The first processor may then learn through snooping that a second processor is attempting to access data from the same page of main memory. If the first processor determines that the second processor should also have access rights to that page, then the MESI state of the corresponding cache lines in the second processor must be changed to "Shared". First, however, to maintain cache coherency, the first processor must inform the second processor to wait while the first processor writes back the modified data to main memory. After completing the write back operation, the first processor will then inform the second processor that the status of that page of memory should be changed in the cache of the second processor to the "Shared" state. The second processor must then perform a tag comparison for each address found in the page to set the state of the corresponding cache lines. This sequential process requires many clock cycles to complete.

The previous discussion illustrates that to modify the state of a set of cache lines requires that the cache lines to be modified be determined through the tag comparison process. However, this process has been shown often to reduce the speed of memory access operations to an unacceptable level. Thus, it is an object of the present invention to selectively update the state of cached data without the need for performing tag comparisons.

SUMMARY OF THE INVENTION

The present invention provides a method and apparatus for selectively modifying the state of cached data without performing a tag comparison. Each cache line includes at least one attribute bit and at least one state bit. A processor issues an instruction requesting modification of the state of all cache lines associated with an attribute specified by the instruction. Qualifying logic modifies the state of a cache line as a function of the attributes stored in the cache line and the attribute specified by the instruction.

BRIEF DESCRIPTION OF THE DRAWINGS

The objects, features and advantages of the present invention will be apparent from the following detailed description in which:

FIG. 6 is a logical attribute unit of the present invention.

DETAILED DESCRIPTION OF THE INVENTION

The present invention provides a method and apparatus for quickly modifying the cache state. For purposes of explanation, specific embodiments are set forth to provide a thorough understanding of the present invention. However, it will be apparent to one skilled in the art that the invention may be practiced without these details. In other instances, well known elements, devices, process steps and the like are not set forth in detail in order to avoid unnecessarily obscuring the present invention.

Figure 1:
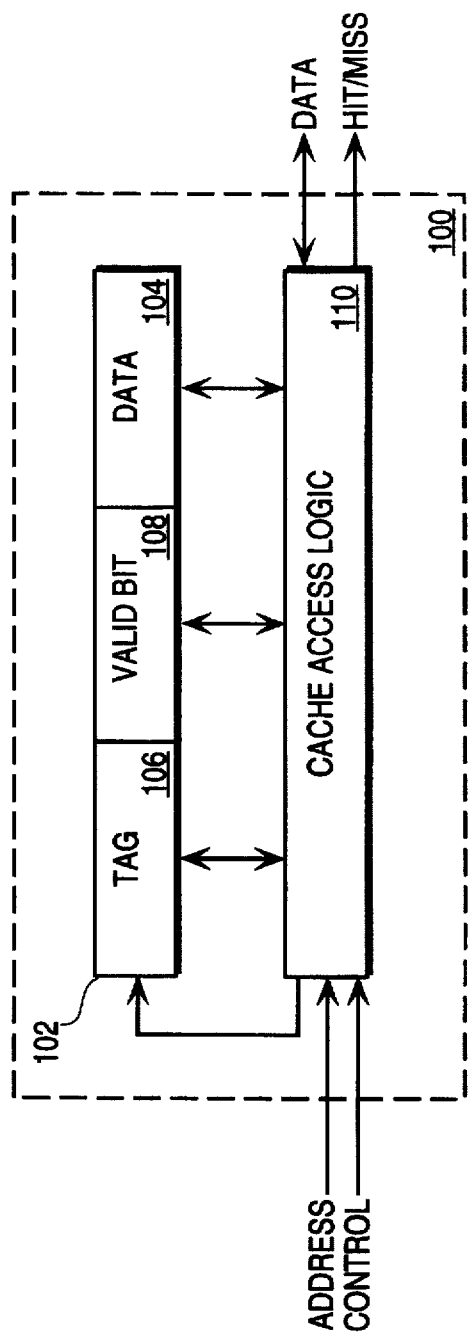
FIG. 1 is a block diagram of a prior art cache.
Figure 2:
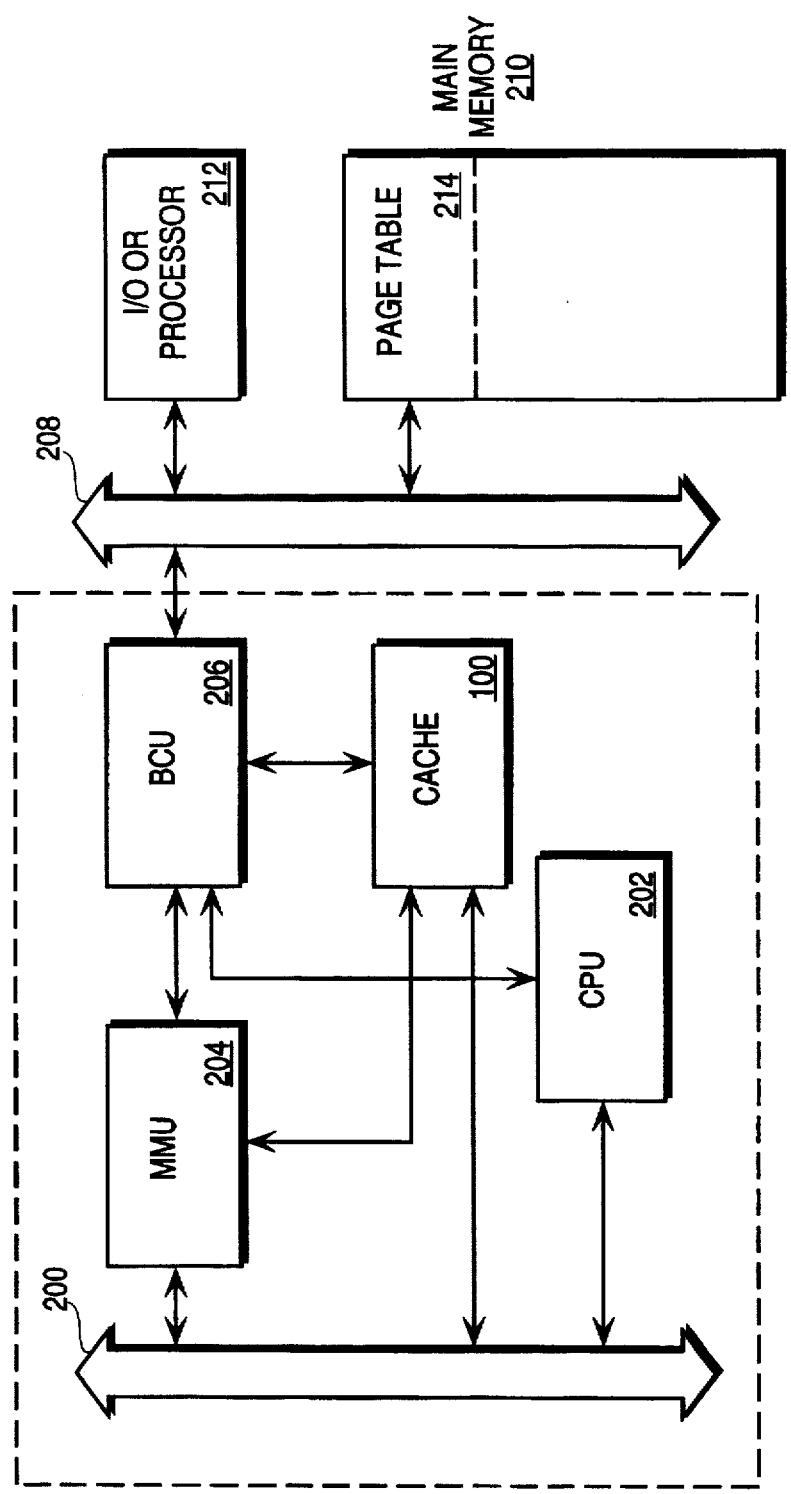
FIG. 2 illustrates the use of conventional cache in a computer system.
Figure 3:
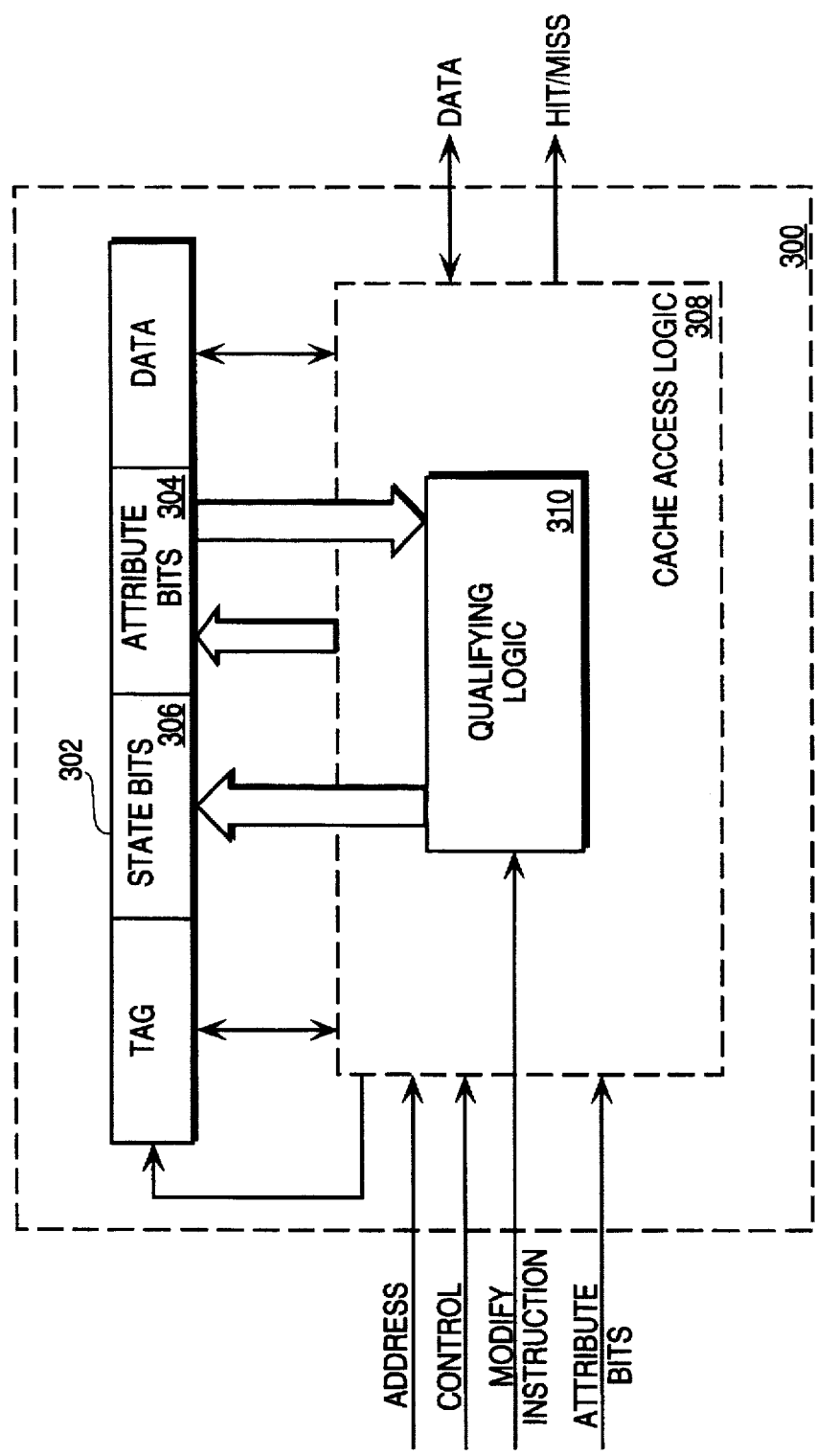
FIG. 3 illustrates one embodiment of the cache of the present invention.

FIG. 3 illustrates one embodiment of a cache 300 of the present invention. Each cache line 302 of the present invention has been extended to include a set of attribute bits 304. The attribute bits may, for example, indicate memory regions that the programmer wishes to make quickly invalidatable, or the process number of a process in a multi-tasking system. The state bits 306 represent the state of the cache line, such as whether it is valid or invalid, or the MESI state. The cache 300 of the present invention includes a cache access logic circuit 308, which in turn includes a qualifying logic circuit 310 of the present invention. The qualifying logic 310 permits the state bits 306 to be modified as a function of the attribute bits 304 and a modify instruction issued by the CPU.

Figure 4:
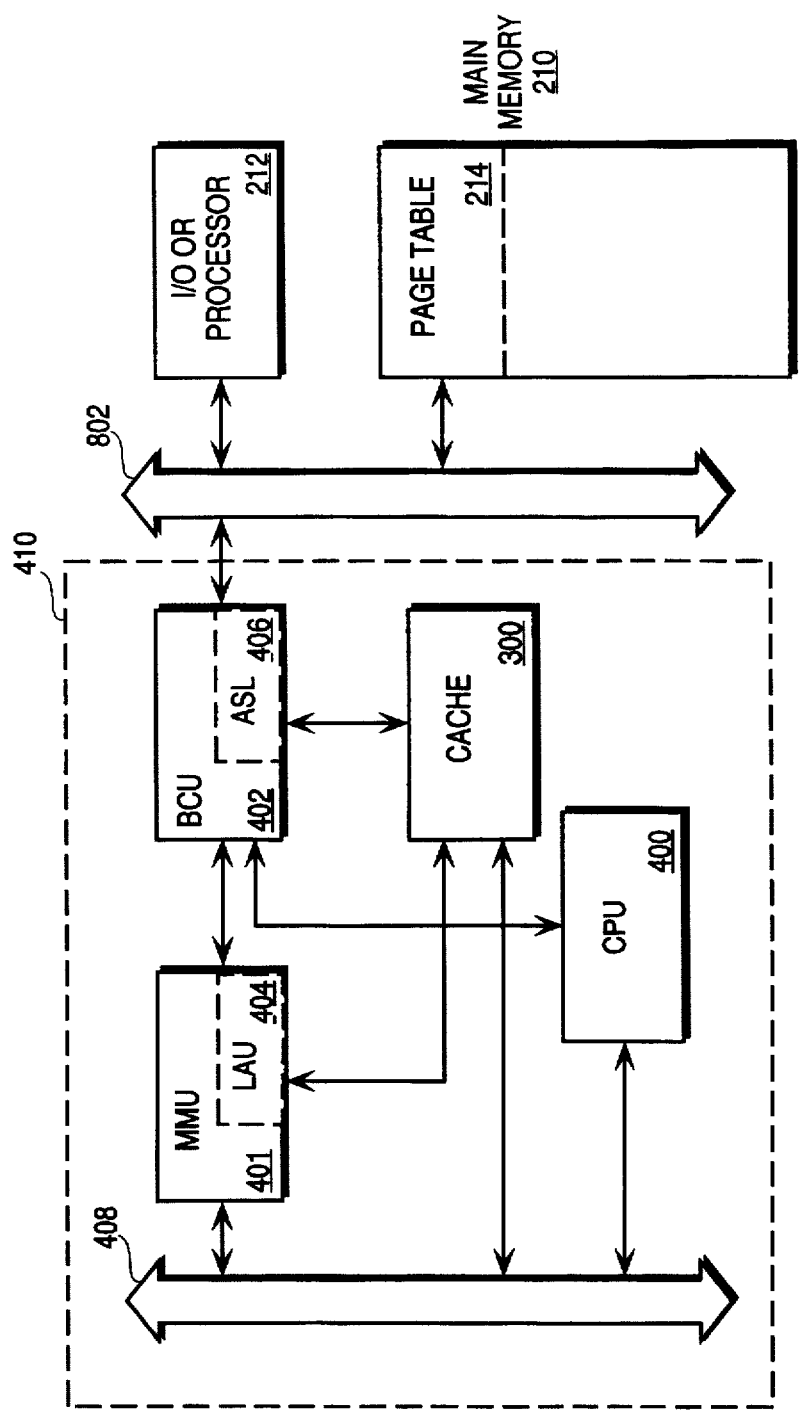
FIG. 4 illustrates a computer system of the present invention incorporating a cache of the present invention.

The general operation of the cache 300 will be explained with reference to the block diagram of FIG. 4 and the flowchart of FIG. 5. FIG. 4 is an embodiment of a computer system of the present invention incorporating the cache 300. The computer system includes a CPU 400 along with an MMU 401 and a BCU 402, as well as the cache 300. The CPU 400 interacts with the cache 300 over an internal CPU bus 408. The CPU 400 MMU 401, BCU 402 and cache 300 may all reside on the same processor chip 410. The processor chip 410 is coupled to the I/O or processor 212 and the main memory 210 via the main memory bus 802. The MMU 401 includes a circuit of the present invention that is denoted a "logical attribute unit" (LAU) 404, and the BCU 402 includes a circuit of the present invention that is denoted "attribute setting logic" (ASL) 406. Note that in an alternative embodiment discussed below, the LAU 404 need not be located within the MMU 401. In fact, the LAU 404 may be located outside the processor chip. Moreover, the present invention is not limited to a computer system that requires an MMU for virtual-to-physical address translation.

Figure 5:
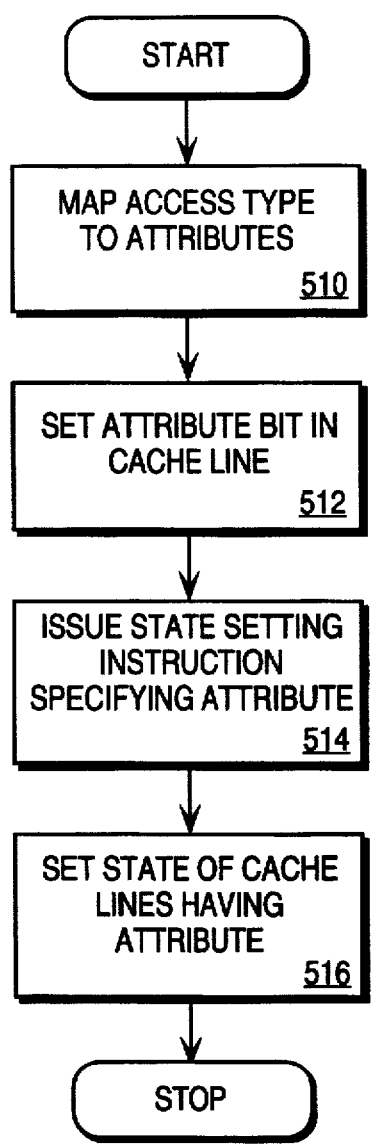
FIG. 5 is a flowchart diagramming the process of the present invention.

Referring to FIG. 5, at some point in time the association of attributes with the type of access to main memory is established (Step 510). Three types of accesses will be described herein, although the present invention should be understood as not being limited to those types. First, the address of the access may determine the attribute value. Second, the attribute may be mapped to the state of the processor. Third, the attribute may represent the type of data that is being accessed.

Figure 6:
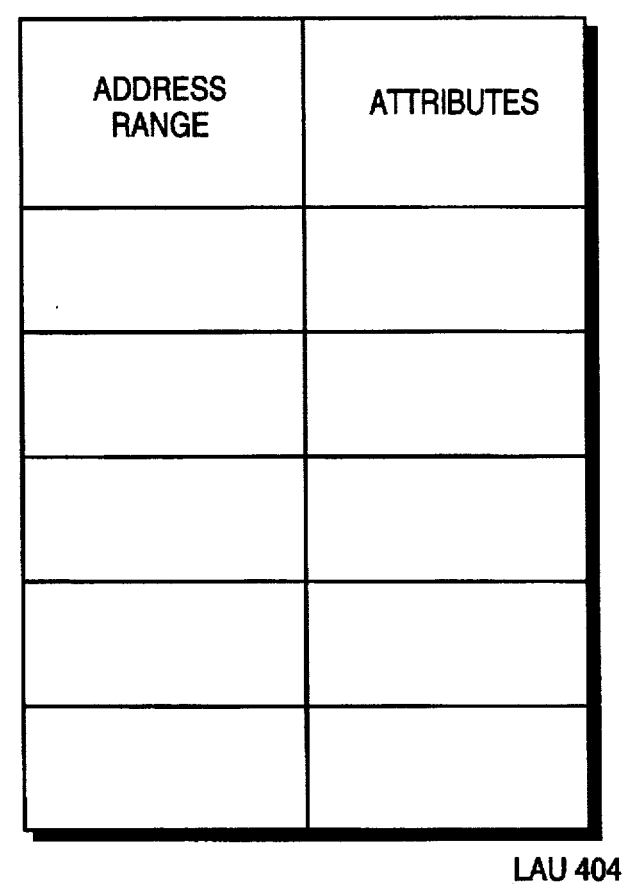

To implement the mapping of address range to attribute, in one embodiment the attribute bits 304 (shown in FIG. 3) may initially be stored in the page table 214 along with other characteristics of different address ranges. In that case, when an address is cached in the cache 300, the attribute bits of that address and of a predefined block of adjacent addresses may be stored in the LAU 404, which may itself be implemented as a cache. Alternatively, as shown in FIG. 6, because the attributes themselves would most likely not require as much storage space as the total amount of information normally contained in a page table, all of the attributes along with their corresponding address ranges initially may be stored directly in the logical address unit 404 of the processor chip. Thus, the present invention is not limited to a computer system using a page table, as long as the relationship between addresses and their corresponding attributes is maintained somewhere in the system.

When the CPU 400 attempts to access memory, the address is presented to the MMU 401. Assuming that this is the first access to that area of memory, the cache access logic 308 will indicate a cache miss. The BCU then retrieves the appropriate cache line from main memory and stores it in the cache 300. For the first type of access, the attribute setting logic 406 in the BCU 402 obtains the attributes corresponding to the retrieved cache line from the logical attributes unit 404. The ASL 406 then writes this information into the attribute bits 304 of the cache line 302 stored in the cache 300 (Step 512 of FIG. 5).

The CPU 400 issues an instruction requesting modification of the state of all cache lines associated with an attribute specified by the instruction (Step 514). The qualifying logic 310 is configured to allow the state 306 of each cache line to be modified as a logical function of the attribute bits 304 and the "modify" instruction (Step 516). In general, the qualifying logic 310 can be implemented using simple combinational logic. The present invention thus allows the CPU to modify simultaneously the state of all cache lines associated with a given set of attribute bits in one clock cycle. This structure also avoids the need to compare address tags sequentially to determine which cache lines contain the states to be modified.

Figure 7:
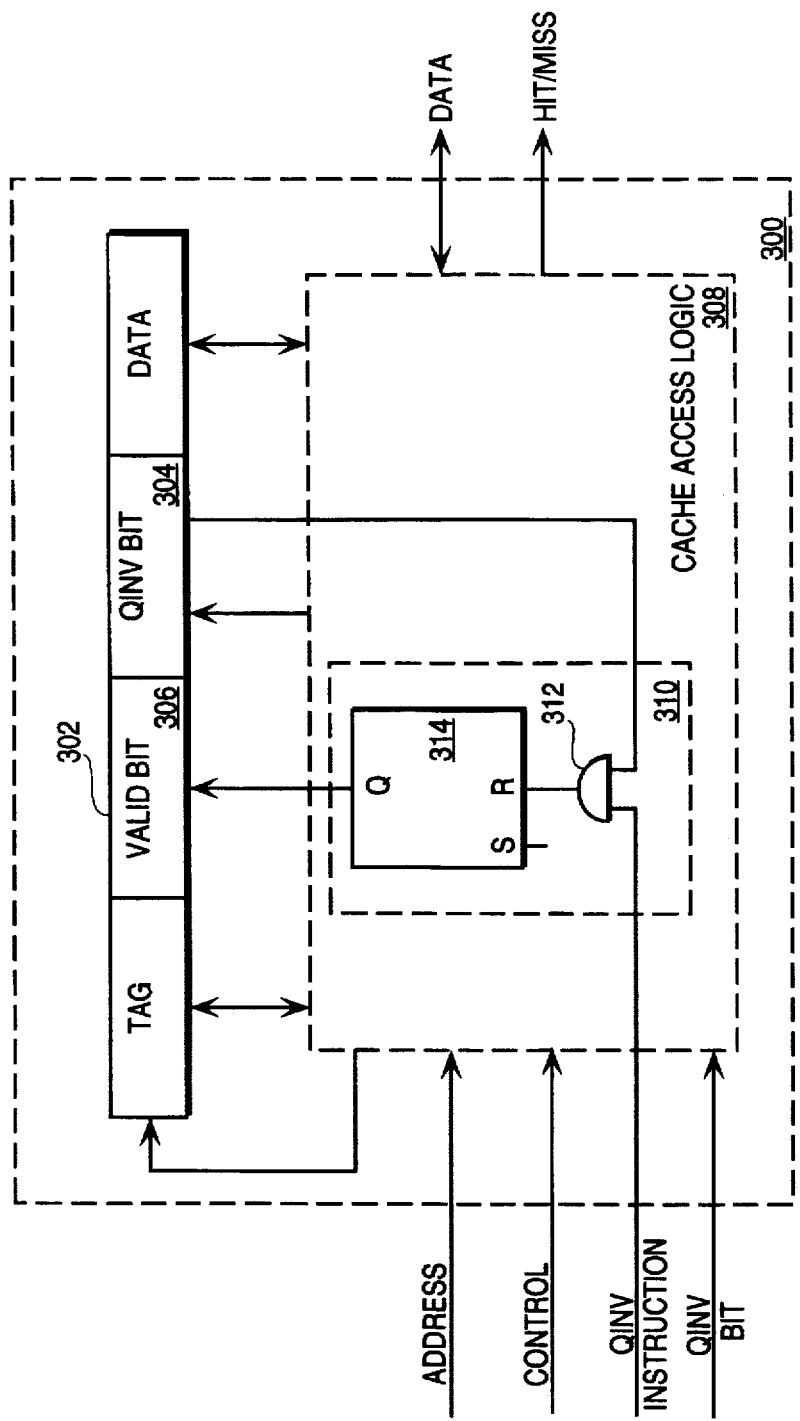
FIG. 7 is another embodiment of the cache of the present invention.

A more specific example of the operation of the present invention for the first type of access is explained with reference to FIG. 7. The figure illustrates the use of one instruction to invalidate all cache lines tagged with a bit indicating that they are "quickly invalidatable." This implementation could be used to invalidate the cache lines associated with the buffer area accessed by an Ethernet controller. In this case, the state 306 to be modified is the valid bit, and the corresponding attribute 304 is a bit representing that the line is deemed to be quickly invalidatable (QINV bit). When a line containing quickly invalidatable data is cached, the attribute setting logic 406 of the BCU 402 sets the QINV bit 304 according to the appropriate attribute stored in the LAU 404. The valid bits 306 stored at all cache lines containing a QINV bit that is set to one are all simultaneously reset in parallel by an invalidate instruction from the CPU 400 using the qualifying logic 310. In this embodiment, the qualifying logic can be implemented using an AND gate 312, which resets a flip-flop 314 when the QINV bit 304 is set and a one bit is received as data from the invalidate instruction sent by the CPU 400. When reset, flip-flop 314 resets the valid bit 306.

For the second type of access, to implement the mapping of processor state to attribute, the CPU 400 controls the setting of the attribute bits. This feature proves useful in a number of situations. For example, a user may want to invalidate all cache lines used by a predefined process or application program in a multi-tasking system after the user has finished using the application. Alternatively, the attribute may represent cache lines containing information used by the processor while handling an interrupt, or the protection level (e.g., user/supervisor state) of the processor while accessing the information in the cache lines. In these cases, the CPU 400, while running the processor, the application or while in the predetermined state, instructs the attribute setting logic 406 in the BCU 402 to mark the cache lines 302 that contain memory addresses used by the CPU while running the process or application, or while in the predetermined state, with attribute bits representing the desired attribute.

After the processor has changed state, the CPU 400 may issue an instruction to the qualifying logic 310 specifying the attributes of the cache lines that are to have their state changed. For example, after the CPU 400 has finished running an application program or interrupt handler, the CPU may quickly invalidate all cache lines used by the application or interrupt handler. Using circuit design techniques well known in the art, the combinational logic of logic 310 is configured to clear the valid bits of all cache lines having attribute bits 304 that specify the application or interrupt handler identified by the CPU instruction.

As another example, the attribute bits 304 may represent process number, and the state bits 306 represent the MESI state. For example, in a multiprocessor system the system designer may want all cache lines used by an application program to be shared by all processors. As before, the CPU 400 instructs the attribute setting logic 406 to write the process number into the attribute bits 304 as the CPU 400 accesses the information at the cache lines used by the process. The CPU 400 issues a modify instruction to the qualifying logic 310 specifying the process number of the application. The qualifying 310 compares the process number of each cache line 302 to the process number specified by the modify instruction. For all cache lines for which those two quantities are equal, the logic 310 changes the state 306 of those lines to "Shared."

As for the third type of access, the mapping of data type to attribute is a special case of the CPU setting the attribute bits. For example, when using a unified instruction/data cache, the CPU may set the attribute bits to indicate whether it is fetching and caching either instructions or data. The processor may need to use a cached application program repeatedly, but may only need the data for a short period of time. Accordingly, the CPU 400 could request that the cache lines holding the data be invalidated after it has finished using the data.

Alternatively, the data may be marked as being speculative or nonspeculative. For example, if a processor is executing a loop of ten load operations, it may speculatively execute four load operations at a time and cache the results, while storing the speculative results of the previous four speculatively executed loads into the actual architecture registers. It can be seen that after performing ten iterations, the processor will have prefetched three sets of four load operations. After the processor has passed through the ten iterations and retired the speculative results into the architectural registers, the twelve prefetched data items in the cache are no longer of use. Accordingly, as the CPU performs the speculative loads and caches the results, it marks the corresponding cache line as containing speculative data. The CPU itself is informed that an operation is speculative by a field in the opcode of the instruction. For example, a compiler would optimize the loop of load instructions by substituting prefetched loads for the source code, resulting in a corresponding change in the opcode. After passing through ten iterations of the loop, the processor can then quickly invalidate the cache lines holding (now unnecessary) speculative data.

Figure 8:
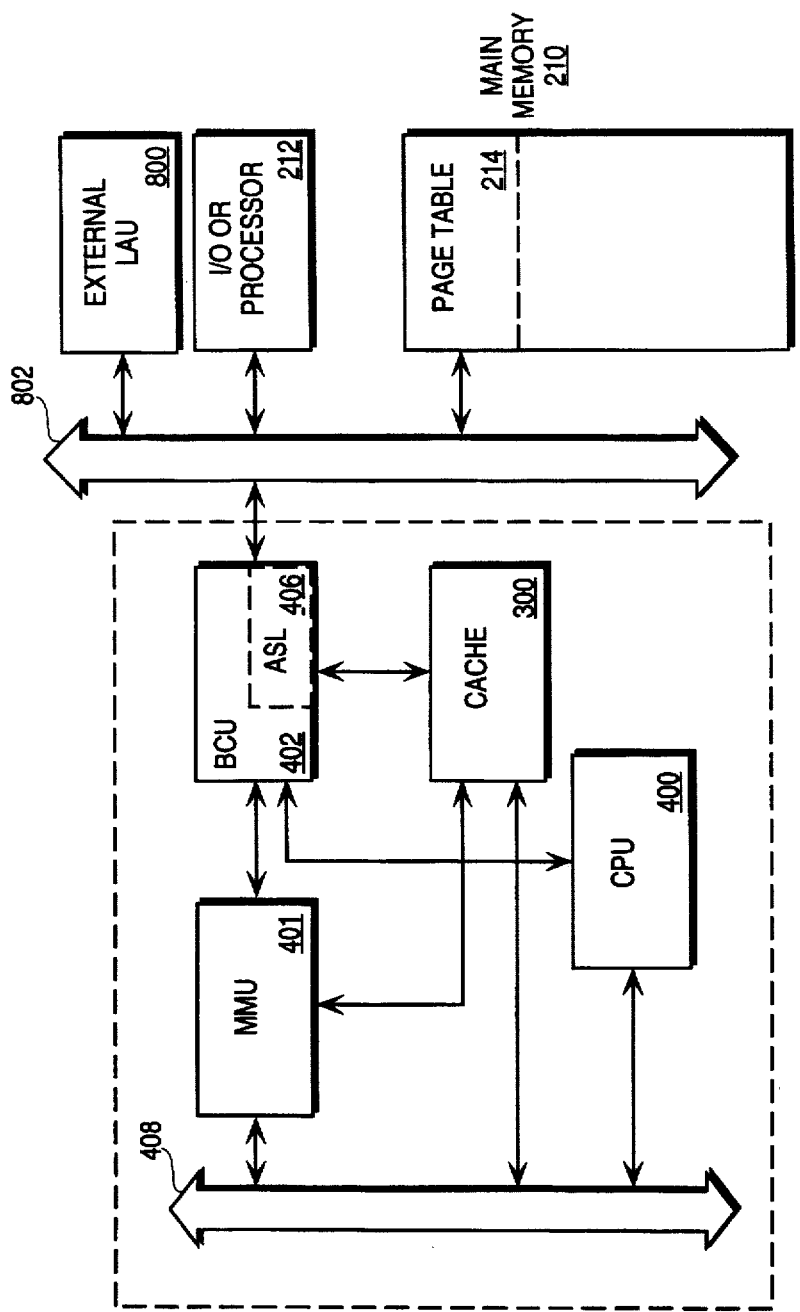
FIG. 8 illustrates a computer system incorporating an external logical attribute unit of the present invention.

It was mentioned above that the LAU may be located outside the processor chip. For example, as shown in FIG. 8, an external LAU 800 may be coupled to the processor through the main memory bus 802. This external LAU 800 can be preprogrammed like the internal LAU 404 to hold a mapping of addresses to attributes. For example, the external LAU can be preprogrammed with the buffer address as used by an Ethernet controller and mapped to the attribute of being quickly invalidatable. When the CPU 400 attempts to access an area of main memory that is also mapped by the external LAU 800, the LAU 800 returns the corresponding attribute bits to the cache 300 through dedicated attribute pins of the attribute setting logic 406 along with the data that is retrieved over the usual data lines from main memory 210.

Based on the foregoing examples, one can see that the present invention is generally applicable to the modification of any conceivable cache state as a function of the attributes of a cache line and a predetermined instruction issued by the CPU. Thus, although the invention has been described in conjunction with preferred embodiments, it will be appreciated that various modifications and alterations may be made by those skilled in the art without departing from the spirit and scope of the invention.

We claim:

1. An apparatus for performing operations on cached information, the apparatus comprising:
   a cache having at least one cache line, the at least one cache line representing corresponding cached information, the at least one cache line including at least one attribute bit and at least one state bit, the at least one attribute bit representing at least one attribute of the at least one cache line, the at least one state bit representing a state of the at least one cache line, wherein the at least one attribute is a user/supervisor state of the processor;
   attribute setting circuitry for setting the at least one attribute bit of a corresponding cache line in response to a control signal from a processor; and
   qualifying logic that receives the at least one attribute bit and an instruction specifying a predetermined attribute, the qualifying logic setting the at least one state bit in response to the at least one attribute bit and the instruction without performing a tag comparison.

2. An apparatus for performing operations on cached information, the apparatus comprising:
   a cache having at least one cache line, the at least one cache line representing corresponding cached information, the at least one cache line including at least one attribute bit and at least one state bit, the at least one attribute bit representing an attribute of the at least one cache line, the at least one state bit representing a state of the at least one cache line wherein the at least one attribute indicates whether the corresponding cached information represented by the at least one cache line is information used by an interrupt handler;
   attribute setting circuitry for setting the at least one attribute bit of a corresponding cache line in response to a control signal from a processor; and
   qualifying logic that receives the at least one attribute bit and an instruction specifying a predetermined attribute, the qualifying logic setting the at least one state bit in response to the at least one attribute bit and the instruction without performing a tag comparison.

3. An apparatus for performing operations on cached information, the apparatus comprising:
   a cache having at least one cache line, the at least one cache line representing corresponding cached information, the at least one cache line including at least one attribute bit and at least one state bit, the at least one attribute bit representing an attribute of the at least one cache line, the at least one state bit representing a state of the at least one cache line wherein the at least one attribute indicates whether the corresponding cached information represented by the at least one cache line is an instruction or data;
   attribute setting circuitry for setting the at least one attribute bit of a corresponding cache line in response to a control signal from a processor; and
   qualifying logic that receives the at least one attribute bit and an instruction specifying a predetermined attribute, the qualifying logic setting the at least one state bit in response to the at least one attribute bit and the instruction without performing a tag comparison.

4. An apparatus for performing operations on cached information, the apparatus comprising:
   a cache having at least one cache line, the at least one cache line representing corresponding cached information, the at least one cache line including at least one attribute bit and at least one state bit, the at least one attribute bit representing an attribute of the at least one cache line, the at least one state bit representing a state of the at least one cache line wherein the at least one attribute indicates whether the corresponding cached information represented by the at least one cache line is speculative or nonspeculative;
   attribute setting circuitry for setting the at least one attribute bit of a corresponding cache line in response to a control signal from a processor; and
   qualifying logic that receives the at least one attribute bit and an instruction specifying a predetermined attribute, the qualifying logic setting the at least one state bit in response to the at least one attribute bit and the instruction without performing a tag comparison.

5. An apparatus for performing operations on cached information, the apparatus comprising:
   a cache having at least one cache line, the at least one cache line representing corresponding cached information, the at least one cache line including at least one attribute bit and at least one state bit, the at least one attribute bit representing an attribute of the at least one cache line, the at least one state bit representing a state of the at least one cache line wherein the at least one attribute indicates that the at least one cache line is to be invalidated in response to the instruction, the at least one state bit being a valid/invalid bit;
   attribute setting circuitry for setting the at least one attribute bit of a corresponding cache line in response to a control signal from a processor; and
   qualifying logic that receives the at least one attribute bit and an instruction specifying a predetermined attribute, the qualifying logic setting the at least one state bit in response to the at least one attribute bit and the instruction without performing a tag comparison.

6. A computer system comprising:
   a processor;
   an apparatus that performs operations on cached information, the apparatus being coupled to the processor and comprising,
      a cache having at least one cache line, the at least one cache line representing corresponding cached information, the at least one cache line including at least one attribute bit and at least one state bit, the at least one attribute bit representing at least one attribute of the at least one cache line, the at least one state bit representing a state of the at least one cache line, wherein the at least one attribute is a user/supervisor state of the processors;
      attribute setting circuitry that sets the at least one attribute bit of a corresponding cache line in response to a control signal from the processor; and
      qualifying logic that receives the at least one attribute bit and an instruction specifying a predetermined attribute, the qualifying logic setting the at least one state bit as a function of the at least one attribute bit and the instruction.

7. A computer system comprising:
   a processor;
   an apparatus that performs operations on cached information, the apparatus being coupled to the processor and comprising, a cache having at least one cache line, the at least one cache line representing corresponding cached information, the at least one cache line including at least one attribute bit and at least one state bit, the at least one attribute bit representing at least one attribute of the at least one cache line, the at least one state bit representing a state of the at least one cache line, wherein the at least one attribute indicates whether the corresponding cached information represented by the at least one cache line is information used by an interrupt handler;

attribute setting circuitry that sets the at least one attribute bit of a corresponding cache line in response to a control signal from the processor; and qualifying logic that receives the at least one attribute bit and an instruction specifying a predetermined attribute, the qualifying logic setting the at least one state bit as a function of the at least one attribute bit and the instruction.

8. A computer system comprising:

a processor;

an apparatus that performs operations on cached information, the apparatus being coupled to the processor and comprising, a cache having at least one cache line, the at least one cache line representing corresponding cached information, the at least one cache line including at least one attribute bit and at least one state bit, the at least one attribute bit representing at least one attribute of the at least one cache line, the at least one state bit representing a state of the at least one cache line, wherein the at least one attribute indicates whether the corresponding cached information represented by the at least one cache line is instruction or data;

attribute setting circuitry that sets the at least one attribute bit of a corresponding cache line in response to a control signal from the processor; and qualifying logic that receives the at least one attribute bit and an instruction specifying a predetermined attribute, the qualifying logic setting the at least one state bit as a function of the at least one attribute bit and the instruction.

9. A computer system comprising:

a processor;

an apparatus that performs operations on cached information, the apparatus being coupled to the processor and comprising, a cache having at least one cache line, the at least one cache line representing corresponding cached information, the at least one cache line including at least one attribute bit and at least one state bit, the at least one attribute bit representing at least one attribute of the at least one cache line, the at least one state bit representing a state of the at least one cache line, wherein the at least one attribute indicates whether the corresponding cached information represented by the at least one cache line is speculative or nonspeculative data;

attribute setting circuitry that sets the at least one attribute bit of a corresponding cache line in response to a control signal from the processor; and qualifying logic that receives the at least one attribute bit and an instruction specifying a predetermined attribute, the qualifying logic setting the at least one state bit as a function of the at least one attribute bit and the instruction.

10. A computer system comprising:

a processor;

an apparatus that performs operations on cached information, the apparatus being coupled to the processor and comprising, a cache having at least one cache line, the at least one cache line representing corresponding cached information, the at least one cache line including at least one attribute bit and at least one state bit, the at least one attribute bit representing at least one attribute of the at least one cache line, the at least one state bit representing a state of the at least one cache line, wherein the at least one attribute indicates that the at least one cache line is to be invalidated in response to the instruction, the at least one state bit being a valid/invalid bit; and qualifying logic that receives the at least one attribute bit and an instruction specifying a predetermined attribute, the qualifying logic setting the at least one state bit as a function of the at least one attribute bit and the instruction.

11. A method for performing operations on cached information, at least one cache line of a cache representing corresponding cached information, the at least one cache line including at least one attribute bit and at least one state bit, the at least one attribute bit representing at least one attribute of the at least one cache line, the at least one state bit representing a state of the at least one cache line, the method comprising the steps of:

issuing an instruction specifying a predetermined attribute;

setting at least one state bit of the at least one cache line as a function of the at least one attribute bit and the instruction; and setting the at least one attribute bit of a corresponding cache line in response to a control signal from a processor, wherein the at least one attribute is a user/supervisor state of the processor.

12. A method for performing operations on cached information, at least one cache line of a cache representing corresponding cached information, the at least one cache line including at least one attribute bit and at least one state bit, the at least one attribute bit representing at least one attribute of the at least one cache line, the at least one state bit representing a state of the at least one cache line, the method comprising the steps of:

issuing an instruction specifying a predetermined attribute;

setting at least one state bit of the at least one cache line as a function of the at least one attribute bit and the instruction; and setting the at least one attribute bit of a corresponding cache line in response to a control signal from a processor, wherein the at least one attribute indicates whether the corresponding cached information represented by the at least one cache line is information used by an interrupt handler.

13. A method for performing operations on cached information, at least one cache line of a cache representing corresponding cached information, the at least one cache line including at least one attribute bit and at least one state bit, the at least one attribute bit representing at least one attribute of the at least one cache line, the at least one state bit representing a state of the at least one cache line, the method comprising the steps of:

issuing an instruction specifying a predetermined attribute;

setting at least one state bit of the at least one cache line as a function of the at least one attribute bit and the instruction; and setting the at least one attribute bit of a corresponding cache line in response to a control signal from a processor, wherein the at least one attribute indicates whether the corresponding cached information represented by the at least one cache line is instruction or data.

14. A method for performing operations on cached information, at least one cache line of a cache representing corresponding cached information, the at least one cache line including at least one attribute bit and at least one state bit, the at least one attribute bit representing at least one attribute of the at least one cache line, the at least one state bit representing a state of the at least one cache line, the method comprising the steps of:

issuing an instruction specifying a predetermined attribute;

setting at least one state bit of the at least one cache line as a function of the at least one attribute bit and the instruction; and setting the at least one attribute bit of a corresponding cache line in response to a control signal from a processor, wherein the at least one attribute indicates whether the corresponding cached information represented by the at least one cache line is speculative or nonspeculative.

15. A method for performing operations on cached information, at least one cache line of a cache representing corresponding cached information, the at least one cache line including at least one attribute bit and at least one state bit, the at least one attribute bit representing at least one attribute of the at least one cache line, the at least one state bit representing a state of the at least one cache line, the method comprising the steps of:

issuing an instruction specifying a predetermined attribute; and setting at least one state bit of the at least one cache line as a function of the at least one attribute bit and the instruction, wherein the at least one attribute indicates that the at least one cache line is to be invalidated in response to the instruction, the at least one state bit being a valid/invalid bit.

16. A method of caching information, including the steps of:

storing cache lines in a cache;

for each cache line stored, storing tag bits, state bits and attribute bits; wherein the attribute bits comprise bits that:

indicate a user/supervisor state of the processor;

indicate that the at least one cache line is to be invalidated in response to the instruction, the at least one state bit being a valid/invalid bit;

indicate whether corresponding cached information represented by the at least one cache line is information used by an interrupt handler;

indicate whether the corresponding cached information represented by the at least one cache line is an instruction or data; and indicate whether the corresponding cached information represented by the at least one cache line is speculative or nonspeculative;

receiving an instruction from a processor; and when the instruction includes certain attribute bits, changing state bits of each of the cache lines that include the certain attribute bits in one clock cycle.

17. The method of claim 16, wherein the state bits are changed to indicate that the cache line is invalid.

18. The method of claim 16, further comprising the step of associating an access type with an attribute.

* * * * *